United States Patent [19]

Brown et al.

[11] 4,065,656

[45] Dec. 27, 1977

[54] ELECTRICAL RESISTOR AND METHOD OF PRODUCTION

[75] Inventors: John T. Brown; David W. Morgan, both of Corning, N.Y.

[73] Assignee: Corning Glass Works, Corning, N.Y.

[21] Appl. No.: 591,309

[22] Filed: June 30, 1975

[51] Int. Cl.[2] .......... B23K 9/00

[52] U.S. Cl. .......... 219/121 LM; 219/121 L

[58] Field of Search .... 219/121 LM, 121 L, 121 EM, 219/121 EB; 29/610 R, 620; 338/300, 308, 309

[56] References Cited

U.S. PATENT DOCUMENTS

| | | | |
|---|---|---|---|
| Re. 27,772 | 10/1973 | Hanfmann | 219/121 LM |
| 3,293,587 | 12/1966 | Robinson | 219/121 L X |
| 3,530,573 | 9/1970 | Helgeland | 29/620 |
| 3,535,778 | 10/1970 | Falanga et al. | 219/121 LM X |
| 3,596,045 | 7/1971 | Steigerwald et al. | 219/121 EB |
| 3,665,483 | 5/1972 | Becker et al. | 219/121 L X |
| 3,827,142 | 8/1974 | Bennett et al. | 29/620 |
| 3,916,144 | 10/1975 | Schuermann | 219/121 LM |

*Primary Examiner*—J. V. Truhe
*Assistant Examiner*—Fred E. Bell
*Attorney, Agent, or Firm*—Milton M. Peterson; Clinton S. Janes, Jr.; Clarence R. Patty, Jr.

[57] ABSTRACT

A laser beam is used to spiral, or otherwise remove a portion of the resistance material from, a resistance film on a glass substrate. The glass has a radiation absorber incorporated in its composition to minimize transmission of the laser beam through the glass.

4 Claims, 2 Drawing Figures

ELECTRICAL RESISTOR AND METHOD OF PRODUCTION

BACKGROUND OF THE INVENTION

The electrical art is familiar with the practice of producing electrical resistance elements by applying a film of electrically conductive material over an insulating substrate. Among the electro-conductive film materials employed are various forms of carbon, various metals, and, more recently, oxides. While the electro-conductive films may be deposited on any compatible, electrically insulating substrate, a substantial line of commercial resistors have been developed in recent years wherein a tin oxide film doped with antimony oxide is deposited on a glass substrate. The characteristics of such resistors, their method of production, and the history of their development, are described in U.S. Pat. No. 3,437,974 granted Apr. 8, 1969 to J. Spiegler.

The resistance value for an electrical film element may be substantially enhanced by selectively removing a portion of the film material to convert the film into an elongated ribbon of material. To this end, it is common practice to deposit the electrically conducting film on a cylindrical substrate, such as a glass rod, and to spiral the element by cutting, or otherwise removing a thin line of film, to form a helical path therein. Originally, resistors were spiraled by a process of mechanical cutting or abrasion such as described for example in U.S. Pat. No. 1,859,112 issued May 17, 1932 to I. Silberstein. This technique is still widely used in the art, but has certain serious disadvantages. For example, the Spiegler patent, mentioned earlier, is addressed specifically to the problem of mechanical damage to the glass substrate from the cutting or abrading operation. The patent proposes a mechanically strong glass substrate which comprises a glass core with a glass sheath on the core, the coefficient of expansion of the sheath being lower than that of the core to strengthen the substrate.

In addition to the mechanical damage problem described by Spiegler, mechanical cutting or abrasion may produce a jagged edge which limits the electrical precision attainable. Also, there is a distinct physical limit to the width of the path that may be cut in a film, thereby limiting the number of spirals per inch that may be attained and, consequently, the value of electrical resistance attainable in this manner.

PRIOR ART

In recognition of these various problems, the art has proposed alternative means of spiraling resistance elements. These include cutting with an electric arc discharge, such as described for example in U.S. Pat. No. 2,710,325 granted June 7, 1955 to S. A. Johnson; burning with the tip of a hot flame, such as described for example in U.S Pat. No. 2,838,427 granted June 10, 1958 to A. L. Pugh, Jr.; and electron or laser beam machining, as described for example in U.S. Pat. No. 3,530,573 granted Sept. 29, 1970 to W. Helgeland and U.S. Pat. No. 3,534,472 granted Oct. 20, 1970 to M. D. DeJong et al.

SUMMARY OF THE INVENTION

Laser spiraling is a particularly desirable technique because, in addition to avoiding substrate damage from cutting or abrading, it forms a narrower path. This permits more turns per unit length, and hence a higher ultimate resistance value. However, certain problems have been encountered when this technique was employed in conjunction with a film formed on a glass substrate. In particular, the laser beam tended to be transmitted through the glass substrate and to remove film at a second location on the opposite side of the resistance element. This of course ruined the resistor and rendered the process essentially inoperative.

We have now discovered that the composition of the substrate glass can be so modified as to minimize transmission of the laser beam therethrough, and thus avoid the problem of unwanted film removal during laser spiraling. Accordingly, our invention is an improved method of producing a film-type electrical resistor, as well as an improved resistor embodying an electro-conductive film on a glass substrate.

The invention comprises an improved method of producing a film-type, electrical resistor wherein a film of resistance material is deposited on a glass substrate, and the filmed substrate and a laser beam are moved in a predetermined relationship with respect to one another to remove selected areas of resistance material from the film, the improvement in the method being the incorporation in the substrate glass of an ingredient capable of absorbing the laser beam radiation, the ingredient being incorporated in an amount effective to absorb a sufficient amount of the laser beam to prevent damage to film material on the surface of the substrate opposite the exposed surface. The electrical resistor thus produced comprises a glass substrate containing an ingredient capable of absorbing the radiation from a laser beam, an adherent, spiraled, resistive film on the surface of the glass, and spaced, electrically conductive terminal members in electrical contact with the film.

DESCRIPTION OF THE DRAWINGS

The invention is further described with reference to the accompanying drawings wherein.

GENERAL DESCRIPTION OF THE INVENTION

Figure 1:
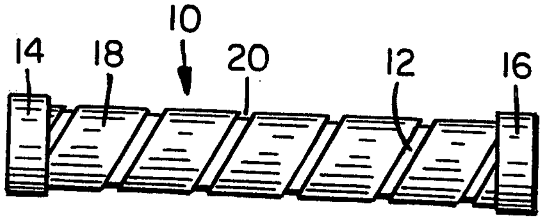
FIG. 1 is a side elevation of a preferred embodiment of a resistor constructed in accordance with the invention.

FIG. 1 illustrates, as a preferred embodiment of the invention, a typical resistor 10 comprising a cylindrical glass rod 12 as a substrate, low resistance metal bands or caps 14 and 16 formed at or over the ends of rod 12 and serving as electrical terminals, and a ribbon 18 of electrically conductive resistance material extending about the surface of glass rod 12 in helical form and defined by a helical path 20.

Ribbon 18 may, as indicated earlier, be composed of any known material used in the formation of electrically conductive film elements, such as carbon, metals, and metal oxides. However, we prefer to employ a tin oxide film doped with antimony oxide which may be produced and applied in a manner described in detail in U.S. Pat. No. 2,564,706 granted Aug. 21, 1951 to John M. Mochel.

In a preferred manufacturing procedure, a continuous length of glass cane is drawn from a source of molten glass, and a film of doped tin oxide is applied to the surface of the glass cane at a suitable temperature as the cane cools on the draw. Thus, a suitably proportioned mixture of tin and antimony chlorides may be vaporized in a chamber surrounding the glass cane and the chloride vapors converted to the corresponding oxides, with such oxides being deposited on the glass as described in detail in the Mochel patent mentioned above. The filmed glass cane thus produced may then be cut into suitable lengths for resistor use and caps, or other terminal members, applied over the ends in known manner. Thereafter, it is customary to mechanically scribe or cut a narrow helical path 20 in the film to produce a helical ribbon, such as ribbon 18, of greatly increased resistance value.

Figure 2:
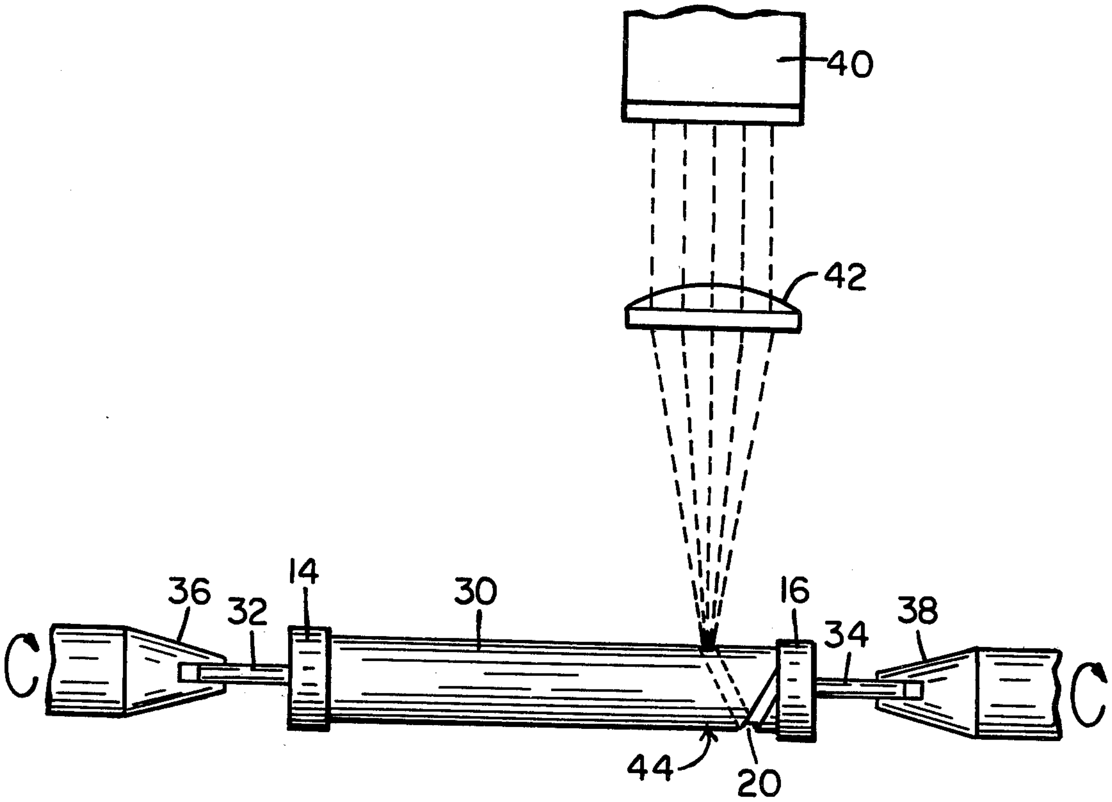
FIG. 2 is a side elevation, diagrammatic view of apparatus for carrying out the invention.

In accordance with the present invention, helical path 20 is produced by a method diagrammatically illustrated in FIG. 2. Resistor blank 30, corresponding to resistor 10 of FIG. 1 but unspiraled, is provided with lead wires 32 and 34 which are mounted in holders 36 and 38 for rotation as indicated by the arrows. The means of rotation is omitted since it forms no part of this invention, and it will be understood that any conventional apparatus may be employed for this purpose. Likewise, if lead wires are not required on the resistor, the resistor blank may be held by the caps, or in other manner as is well known. The essential condition is that the resistor blank be suitably mounted for rotational movement, either with or without coincident lateral movement.

A laser beam source 40, shown schematically, is mounted in such position, relative to resistor blank 30, that its radiation is focused on the surface of the blank by lens 42 as indicated in the drawing. As resistor blank 20 is rotated, the focused laser beam and the rotating blank are moved relative to one another in a lateral direction. This may be accomplished by moving either the laser beam source or the apparatus holding the resistor blank. The combination of rotational and lateral movement causes the laser beam to follow a helical path over the oxide film, and to thereby remove a very narrow strip of such film along such helical path as indicated by numeral 20. The pitch of spiral path 20, and the consequent number of turns per unit length of the blank, will be determined by the rates of rotational speed and of lateral movement.

When the illustrated procedure was practiced with the conventional filmed glass rod as a resistor blank, it was found that, in addition to removing the film material to create path 20, the laser beam also removed, in part at least, film material from the opposite side of the blank, as indicated at the point 44 on blank 20. In accordance with the present invention, we have found that this problem can be avoided by incorporating in the glass, as a glassmaking ingredient, an oxide that absorbs the radiation of the laser beam. The particular materials employed will depend on the wavelength of radiation in the laser beam, but we have found that the oxides of copper and ferrous iron are particularly useful for this purpose.

Heretofore, it has been proposed to spiral a resistor blank with a laser source adapted to continuously produce a high energy beam of electro-magnetic radiation having a wavelength of approximately 10.6 microns (see U.S. Pat. No. 3,534,472). However, in working with glass substrate resistors, we have found that such laser radiation tends to unduly heat the glass substrate and may cause reboil or crazing of the surface. Therefore, we prefer to use an yttria, alumina, garnet (YAG) type laser which operates at a wavelength of 1.06 microns.

With the YAG laser, we find that ferrous oxide (FeO) is a preferred radiation absorbing ingredient in the glass, because the absorption peak for this oxide is almost identical to the wavelength of the YAG laser radiation, namely 1.06 microns. While copper oxide may be employed, its absorption peak occurs at about 0.75 microns, thus necessitating the use of approximately six times as much copper oxide as ferrous oxide for equivalent absorption.

The particular base glass composition to which the absorbing ingredient is added is not critical with respect to effectiveness of the absorbent. Therefore, any substrate glass otherwise suitable for resistor production may be employed, and modified in the manner hereafter illustrated with respect to a preferred embodiment of the invention.

SPECIFIC EMBODIMENTS

As described in U.S. Pat. No. 2,934,736 granted Apr. 26, 1960 to J. K. Davis, alkali metal ions may have a highly detrimental effect on resistance films, particularly tin oxide films, during operation. Therefore, it is desirable to employ a substrate glass essentially free of alkali metal oxides. As modified by the addition of FeO, glasses within the following composition ranges provide preferred substrates for the present invention:

| | |
|---|---|
| $SiO_2$ | 50 - 65% |
| $B_2O_3$ | 0 - 10% |
| $Al_2O_3$ | 10 - 20% |
| MgO | 0 - 11% |
| CaO | 0 - 12% |
| SrO | 0 - 10% |
| BaO | 0 - 9% |
| RO (at least two of MgO, CaO, SrO and BaO) | 10 - 40% |
| FeO and/or CuO | 0.1 - 5% |
| $SnO_2$ | 0 - 3% |
| $Sb_2O_3$ and/or $As_2O_5$ | 0 - 2% |

Specific examples of such preferred glasses, as well as corresponding glasses containing CuO, are illustrated in Table I wherein glass compositions are set forth on the oxide basis as calculated in percent by weight from the glass batch. Also set forth are certain properties of interest measured on glasses having the indicated compositions. Such properties include softening point (Soft. Pt.), annealing point (Ann. Pt.), strain point (Str. Pt.), coefficient of thermal expansion over the range of 0°-300° C. (Exp. $\times 10^{-7}$/° C.), logarithm of electrical resistivity in ohm cm. at 600° C. (Log R), and transmission in percent at wavelength 1.06 microns through a glass thickness of 2.5 mms. (T).

TABLE I

| | 1 | 2 | 3 | 4 | 5 |
|---|---|---|---|---|---|
| $SiO_2$ | 56.9 | 56.9 | 56.9 | 56.9 | 56.9 |
| $B_2O_3$ | 4.5 | 4.5 | 4.5 | 4.5 | 4.5 |
| $Al_2O_3$ | 15.5 | 15.5 | 15.5 | 15.5 | 15.5 |
| MgO | 6.6 | 6.1 | 5.1 | 7.1 | 7.1 |
| CaO | 10.0 | 10.0 | 10.0 | 9.0 | 7.0 |
| BaO | 6.0 | 6.0 | 6.0 | 6.0 | 6.0 |
| CuO | 0.5 | 1.0 | 2.0 | — | — |
| FeO | — | — | — | 1.0 | 3.0 |
| $SnCl_2$ | — | — | — | 1.0 | 1.0 |
| $As_2O_5$ | 0.2 | 0.2 | 0.2 | — | — |
| $Sb_2O_3$ | — | — | — | 0.4 | 0.4 |
| Soft. Pt. C. | 930 | — | 938 | 918 | 912 |
| Ann. Pt. C. | 716 | — | 694 | 711 | 701 |
| Str. Pt. C. | 673 | — | 647 | 669 | 658 |
| Exp. $\times 10^{-7}$/° C. | 43.0 | — | 41.7 | 43.7 | 42.1 |
| Log. R 600° C. | 7.595 | 7.335 | 6.950 | 7.815 | 7.825 |
| T(%) | 84.0 | 71.0 | 41.0 | 8.5 | 0.5 |

In some instances, the present invention will obviate the need for strengthened glass cane substrates such as described and claimed in the Spiegler patent. Nevertheless, it will still be desirable in many cases, particularly with small diameter cane, to use the duplex cane of Spiegler for greater strength. In that event, the sheath or skin glass may be a glass such as described above, that is an alkaline earth, alkali-free, aluminosilicate without absorbent, whereas the cane glass may be one within the following general composition ranges.

| | |
|---|---|
| $SiO_2$ | 50 - 65% |
| $B_2O_3$ | 0 - 10% |
| $Al_2O_3$ | 5 - 20% |
| $Li_2O$ | 0 - 5% |
| $Na_2O$ | 5 - 15% |
| $K_2O$ | 0 - 7% |
| $Li_2O + Na_2O + K_2O$ | 8 - 25% |
| RO (MgO, CaO, BaO, SrO, and/or ZnO) | 0 - 10% |
| FeO and/or CuO | 0.1 - 5% |
| $SnO_2$ | 0 - 3% |
| $Sb_2O_3$ and/or $As_2O_5$ | 0 - 2% |

As indicated, the absorbent oxide is preferably included in the core glass because of its greater bulk in the duplex substrate. Also, while FeO is the preferred absorbent, CuO might be substituted as noted earlier.

The improvement provided by laser beam spiralling in accordance with the invention may be seen from a comparison of maximum spiralling effects attainable with mechanical and laser beam spiralling. The effects are those observed in production of a 0.5 watt type resistor designated as a C5 resistor and having a length of 0.315 inches with a glass substrate diameter of 0.098 inches. With mechanical spiralling, a maximum of 225 turns per inch may be attained with a film path of about 0.003 inch width. By comparison, laser beam spiralling provides a maximum of 385 turns per inch with a film path width of about 0.002 inches. The effective multiplications of resistance over mechanical spiralling allows an increase in maximum resistance value from 1.5 to 5.0 meg ohm for the C5 resistor. The present invention permits this improvement in a glass substrate type resistor without danger of excessive radiation transmission through the glass.

We claim:

1. In a method for producing a spiralled, film type electrical resistor wherein a film of resistance material is deposited on the elongated surface of a glass rod and selected areas of said film of resistance material are removed from said glass rod by exposure to a laser beam, said filmed glass rod and said laser beam being moved relative to one another such that said film of resistance material is removed along a helical path about the periphery of said rod, the improvement which comprises incorporating FeO and/or CuO into the composition of said glass rod in an amount effective to absorb a sufficient amount of said laser beam to prevent damage to said film on the surface of said rod opposite to the surface exposed to said laser beam, said glass rod consisting essentially, in weight percent on the oxide basis, of 10-40% RO, wherein RO consists of at least two of the following oxides in the indicated proportions of 0-11% MgO, 0-12% CaO, 0-10% SrO, and 0-9%, BaO, 10-20% $Al_2O_3$, 0.1-5% FeO and/or CuO, 50-65% $SiO_2$, 0-10% $B_2O_3$, 0-3% $SnO_2$, and 0-2% $As_2O_5$ and/or $Sb_2O_3$.

2. A method according to claim 6 wherein the resistance material is antimony doped tin oxide.

3. A method according to claim 1 wherein the laser beam is generated from a yttria, alumina, garnet type laser operating at a wavelength of about one micron.

4. A method according to claim 1 wherein said glass rod consists of duplex glass cane having a skin glass portion and core glass portion, said skin glass having a composition within that recited in claim 1, but without FeO and/or CuO, and said core glass consisting essentially, in weight percent on the oxide basis, or 0.1-5% FeO and/or CuO, 8-25% $Li_2O + Na_2O + K_2O$, 0-5% $Li_2O$, 5-15% $Na_2O$, 0-7% $K_2O$, 5-20% $Al_2O_3$, 50-65% $SiO_2$, 0-10% $B_2O_3$, 0-10% RO, wherein RO consists of at least one oxide selected from the group MgO, CaO, SrO, BaO, and ZnO, 0-3% $SnO_2$, and 0-2% $As_2O_5$ and/or $Sb_2O_3$.

* * * * *

UNITED STATES PATENT AND TRADEMARK OFFICE
CERTIFICATE OF CORRECTION

PATENT NO. : 4,065,656

DATED : December 27, 1977

INVENTOR(S) : John T. Brown and David W. Morgan

It is certified that error appears in the above-identified patent and that said Letters Patent are hereby corrected as shown below:

Column 1, line 14, "have" should be -- has --.

Column 6, line 25, Claim 2, "6" should be -- 1 --.

Column 6, line 35, Claim 4, "or" should be -- of --.

Signed and Sealed this

*Fifteenth* Day of *August 1978*

[SEAL]

*Attest:*

RUTH C. MASON
*Attesting Officer*

DONALD W. BANNER
*Commissioner of Patents and Trademarks*